United States Patent [19]
Lindemann

[11] 3,744,358
[45] July 10, 1973

[54] SCALPING MACHINE
[75] Inventor: Wolfgang Lindemann, Aachen, Germany
[73] Assignee: Orbit Beratungsgesell-Schaft m.b.H., Aachen, Germany
[22] Filed: Mar. 11, 1971
[21] Appl. No.: 123,165

[30] Foreign Application Priority Data
Mar. 16, 1970 Germany.................... P 20 12 324.4

[52] U.S. Cl. .................................................. 82/20
[51] Int. Cl. ............................................... B23b 5/12
[58] Field of Search ......................................... 82/20

[56] References Cited
UNITED STATES PATENTS
2,289,167  7/1942  Bannister et al..................... 82/20
2,300,967  11/1942  Reed et al.............................. 82/20

FOREIGN PATENTS OR APPLICATIONS
1,203,576  10/1965  Germany............................... 82/20
1,334,278  6/1963  France................................... 82/20

Primary Examiner—Leonidas Vlachos
Attorney—Craig, Antonelli, Stewart & Hill

[57] ABSTRACT

A scalping machine with a nonrotatable workpiece which is fed through a revolving cutter head in which the cutters are not only adjustable in radial directions relative to the workpiece but also so as to vary the angle of their cutting edges relative to a plane extending at right angles to the axis of the workpiece.

8 Claims, 6 Drawing Figures

Patented July 10, 1973 3,744,358

INVENTOR
WOLFGANG LINDEMANN
BY
Craig, Antonelli, Stewart & Hill
ATTORNEYS

SCALPING MACHINE

The present invention relates to a machine tool, a so-called "scalping machine," in which solid or tubular rod stock including wire is nonrotatably clamped and cut so as to reduce its diameter by being fed longitudinally through a revolving cutter head which is provided with a plurality of adjustable cutters.

It is an object of the present invention to improve such a scalping machine of a conventional type in a manner so as to permit the output speed of such a machine and thus also the amount of the output of scalped material to be considerably increased.

When enploying a conventional scalping machine, it would seem to be possible to attain this object either by increasing the rate of feed of the material to be scalped by the machine per each revolution of the cutter head while the cutting speed of the cutters of the cutter head remains unchanged, or by increasing the cutting speed while the rate of feed of the material per revolution of the cutter head remains unchanged, or by increasing both, the cutting speed and the rate of feed per revolution of the cutter head. While an increase of the cutting speed is limited because of the excessive wear upon the cutters which would then result and because of the difficulties of construction of such a machine, it might appear that it should be possible to increase considerably the rate of feed of the material per revolution of the cutter head. If, for example, steel wire of a diameter of 20mm which may be subsequently compressed so as to form high-grade screws or the like or balls for ball bearings is to be scalped so that the thickness of the chips amounts to 1mm (i.e. 2mm per diameter), and the cutting speed amounts to 100 meters per minute, while the speed of rotation of the cutter head amounts to about 1600 r.p.m. and the rate of feed of the wire material per each revolution of the cutter head amounts to 2mm, the output speed of the wire from the machine would amount to 3.2 meters per minute. If the rate of feed per revolution of the cutter head would amount to 20mm, an output speed of 32 meters per minute would be attainable, and if the rate of feed per revolution could amount to 60mm, an output speed of 96 meters per minute would be attainable.

However, the rate of feed of the material per revolution of the cutter head cannot be increased at will which is due to the fact that the higher this rate is made, the more uneven the surface of the scalped material will be. The full power of a wire scalping machine can therefore be utilized ony if it does not matter at all if the wire after being scalped does not have a smooth and proper surface. Of course, what has been said above regarding the scalping of wire equally applies to the scalping of rods or pipes of larger diameters on scalping machines which are designed for such diameters, if the output speed in scalped material is to be considerably increased.

In actual practice this means that, if the output in scalped material with a good surface quality is to be increased, for example, ten times, it would be necessary to provide ten of the conventional scalping machines. It is self-evident that, if this work could be carried out by a single machine, considerable amounts of money could be saved for the purchase as well as for the operation and servicing of such a single machine which would also take up only a fraction of the space which the ten conventional machines would require. A single scalping machine which would fulfill this object could be driven so that its output speed would amount to one half of its cutting speed. Such a machine would require a power of about 2300 HP for driving the cutter head and a power of about 300 HP for feeding the material if the rate of feed per revolution of the cutter head amounts to about 160mm. If, however, as previously indicated, a single high-power machine should produce the same output as ten scalping machines of the conventional type, the surface quality of the scalped material would be entirely unacceptable and the wear upon the cutters would also be so high so as to be unbearable economically. Any considerable increase of the output speed of such a single machine of a conventional design is therefore practically impossible.

In the efforts to attain the above-mentioned object of the present invention it has now been found that, if the cutter head is provided with adjusting means not only for adjusting the cutters in radial directions relative to the workpiece but also for varying the "blade angle" of the cutters, i.e. the angle of incidence of the cutting edge of each cutter relative to a plane which extends at right angles to the axis of the workpiece and thus also to the axis of the cutter head, the difficulties as previously mentioned may be easily overcome and the desired results may be attained with a single scalping machine which, of course, has to be provided with driving and feeding means of a higher power than that of a conventional scalping machine, and which may also be employed for scalping materials of very different diameters. The cutters in the cutter head must then, of course, be adjusted not only in radial directions in accordance with the desired diameter to which the workpiece is to be scalped, but also to a particular blade angle, as described above, which depends upon this diameter. Although the present invention permits the scalping operations now to be carried out at feed rates per revolution of the cutter head which are considerably higher than those at which these operations could previously be carried out on the conventional scalping machines, the surface of the scalped material as now attained is just as smooth as that which was previously attainable. Therefore, the scalping operation also does not produce any grooves in the surface of the scalped material which might result in permanent cracks in this material in the subsequent work thereon.

Another feature of the invention consists in providing at least a part of the cutting edge of each cutter of a concave shape, the curvature of which is dependent upon diameter of the workpiece and the degree of the blade angle to which each cutter has been adjusted. This has the advantage that the scalped surface will be very smooth since the concave part of the cutting edge will act like a smoothing or finishing tool.

For reasons known in this art it is in addition of advantage to provide a conventional scalping nozzle as a finishing tool behind the cutter head so as toavoid a hardening of the scalped surface, especially if a subsequent polishing or drawing operation is to be omitted. This scalping nozzle may in addition also be employed for taking up the pressures which are exerted upon the cutters of the cutter head in the axial direction of the latter by mounting this nozzle closely behind the cutter head and by providing it with an abutment which engages at least indirectly with the cutters so as to brace the same.

These and additional features and advantages of the present invention will become further apparent from the following detailed description thereof which is to be read with reference to the accompanying drawings, in which FIG. 1 shows a side view of a part of the length of a workpiece and a cross section of a part of a rotary cutter head according to the invention which is taken along the line I — I of FIG. 2;

FIG. 5 shows a plan view of a cutter according to the invention which is designed for cutting relatively thick chips; while

Figure 1:
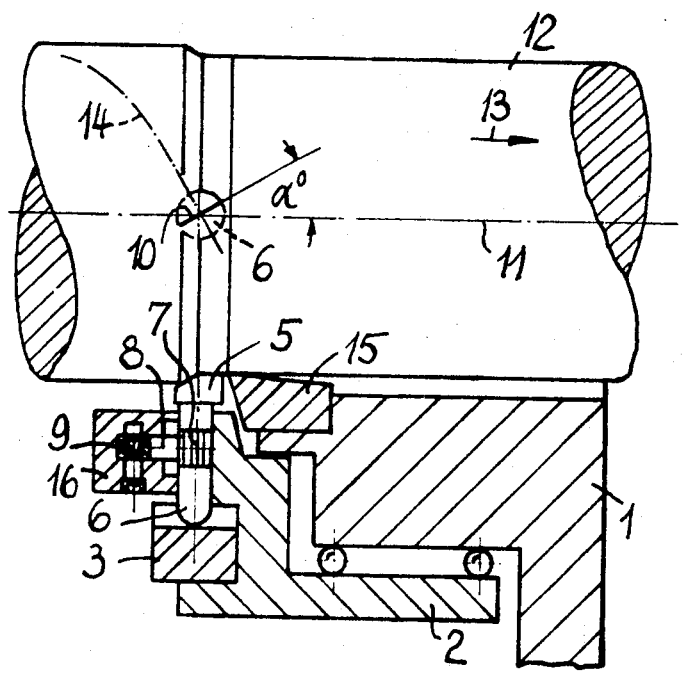
Figure 2:
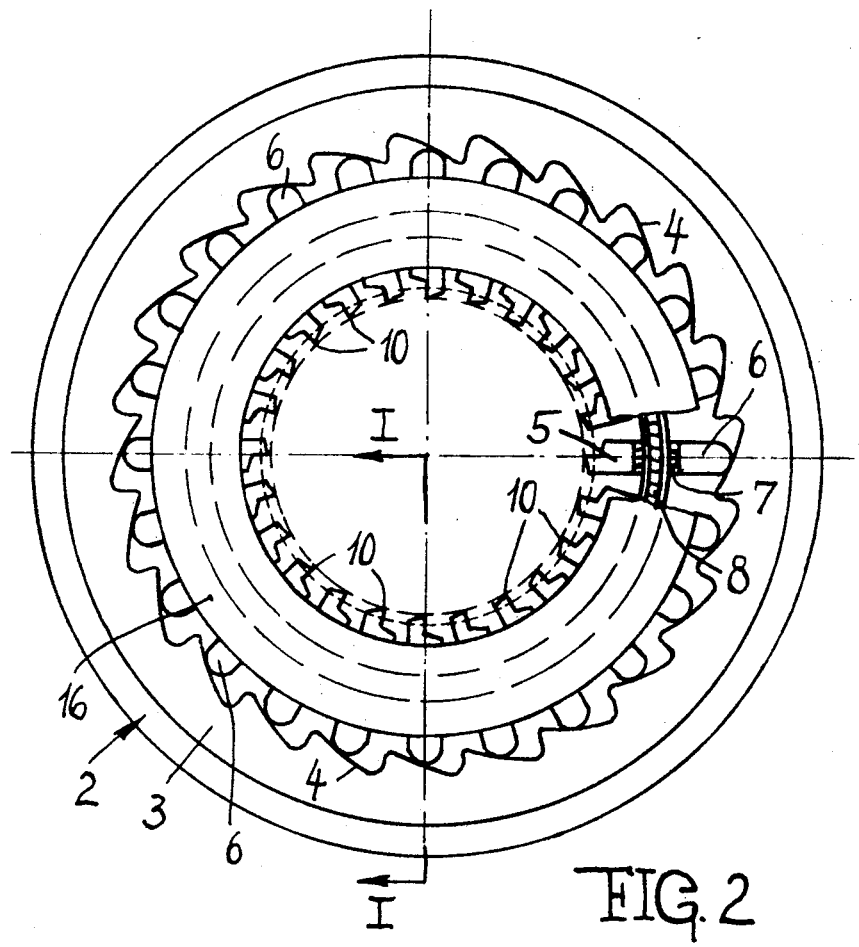
FIG. 2 shows a front view of the cutter head according to FIG. 1, a part of which is broken away to show the details of construction of one of the cutters and its adjusting mechanism.

Referring to the drawings and first particularly to FIGS. 1 and 2, the scalping machine according to the invention comprises a machine housing 1 in which a driven cutter head 2 is rotatably mounted which carries a control ring 3 which is adjustable in its peripheral directions and the inner side of which is provided with inclined toothlike cam surfaces 4 which engage upon the rear ends of tool holders 6 each of which carries a cutter 5. When the control ring 3 is turned within the cutter head 2 relative to the tool holders 6, the cam surfaces 4 acting upon the rear ends of the tool holders 6 will shift the cutters 5 in radial directions toward the workpiece 11. The periphery of each tool holder 6 is provided with a row of teeth 7 which mesh with the teeth on one side of a ring 8, the other side of which is likewise provided with teeth which mesh with a pinion 9. For adjusting the cutting edges 10 of all of the cutters 5 to the desired blade angle $\alpha$ which in the embodiment of the invention as illustrated amounts to about 30°, it is therefore only necessary to turn the pinion 9 by means of a suitable tool. When the cutter head 2 rotates about its axis 11 which coincides with the longitudinal axis of the workpiece 12, and the workpiece 12 is moved at the same time in the direction of the arrow 13, the center of the cutting edge 10 of each cutter 5 will move in the direction of the dot-and-dash line 14 as shown in FIG. 1. The blade angle $\alpha$ of the cutting edges 10 of all cutters 5 should be set so that each of these edges always extends as transversely as possible, that is, at an angle of nearly 90°, to the direction of its cutting movement 14, regardless of the diameter which the particular workpiece 12 might have. This adjustment of the cutters 5 and their cutting edges 10 is similar to the rotary adjustment of the blades of an axial-flow-type turbine.

The blade angle $\alpha$ may be changed, for example, between the values of 0° and 60°. Due to the inclined position of the cutting edges of the cutters 5 which is attained by such an adjustment of the blade angles $\alpha$, it is therefore now possible with a scalping machine which is provided with driving and feeding means of a power higher than that which was required for the operation of previous scalping machines to operate with a very high rate of feed per revolution of the cutter head, but still to be able to attain at all times a surface quality of the scalped workpiece which will be as smooth as may be required. Moreover, the present invention permits the same scalping machine to be used for machining workpieces of very different diameters although obviously it is then necessary not only to adjust the cutters 5 in the radial directions accordingly, but also to vary the blade angle $\alpha$. Thus, for example, it is now possible to scalp a steel wire of a diameter of 10mm at a cutting speed of 100 meters per minute and at an output speed of 50 meters per minute. The scalped surface which is then attained has a quality which was previously attainable only at an output speed of less than 10 meters per minute. As subsequently described in detail, these results are, of course, only attainable if the cutting edges of the cutters are made of a shape so as to act like those of additional finishing or smoothing cutters.

In the embodiment of the invention as illustrated in FIG. 1, the additional annular finishing nozzle 15 is provided in the machine housing 1 behind the cutter head 2. This finishing nozzle 15 should, of course, be mounted on the machine housing so as to permit it to be exchanged without difficulty by one of another cross-sectional size. It should therefore be provided on a tube, not shown, which, in turn, may be removably secured within the machine housing. Such a finishing nozzle should preferably also be adapted to be heated or cooled. By maintaining this nozzle at a constant temperature, the scalped workpiece when finished will also have a constant diameter, whereas by cooling or heating the nozzle, it is also possible to vary the diameter of the annular cutting edge of the nozzle. This diameter may be increased, for example, by heating the nozzle to a temperature of 300°C which will not affect the properties of carbide tools. The finishing nozzle may also be mounted in a fixed position on the cutter head itself, especially if for any reason the particular cutter head does not need to be adjustable for scalping workpieces of very different diameters. The provision of a finishing nozzle immediately behind the cutters of the cutter head has the advantage that it may positively engage with and support the cutters which are subjected to very high pressures, for example, in order to prevent the occurrence of vibrations of the cutters. In this case, the finishing nozzle should be connected to the cutter head so as to rotate together with the latter. It may, however, sometimes be advisable to mount the finishing nozzle in a stationary position and to support the cutter head or even the cutters themselves by frictionally engaging therewith.

The means for adjusting the ring 8 which is provided with gear teeth on both sides may be of any desired construction. In the present case as illustrated it is assumed that the housing part 16 of the cutter head in which this ring 8 is mounted is rotatable together with the cutter head 2 so that ring 8 can be adjusted only when the cutter head 2 is stopped. If desired, however, the housing part 16 may also be designed so as to be adjustable relative to the cutter head to permit the blade angle $\alpha$ to be changed while the cutter head continues to rotate. This, of course, requires a more expensive construction which, however, is hardly ever required since the blade angle $\alpha$ usually needs to be adjusted only when the cutter head is stopped. In a similar manner it is also possible to provide suitable means for turning the control ring 3 relative to the cutter head so as to permit the cutters 5 to be adjusted in their radial directions without requiring the cutter head to be stopped.

Figure 3:
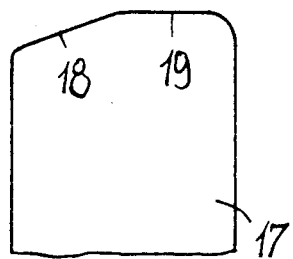
FIG. 3 shows a plan view of a carbide-tipped cutter of a conventional type.
Figure 4:
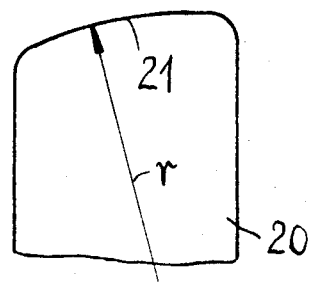
FIG. 4 shows a plan view of a high-speed cutter of a conventional type which is provided with a curved cutting edge.

For illustrating the differences between the cutters as previously employed in scalping machines and the cutters which are designed in accordance with the present invention, reference is made to FIGS. 3 to 6. Carbide-tipped cutters 17 of the conventional type as shown in FIG. 3 are usually provided with an inclined cutting edge 18 and a following smoothing edge 19, while high-speed cutters 20 as shown in FIG. 4 are often provided with a continuous convex or arcuate cutting edge 21 which may have, for example, a radius of curvature $r$, as illustrated.

Figure 5:
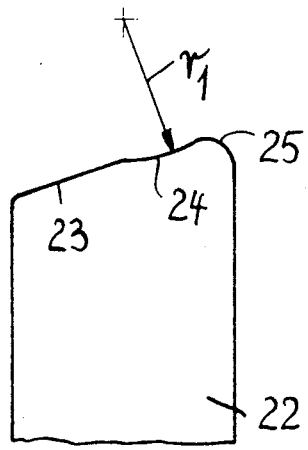
Figure 6:
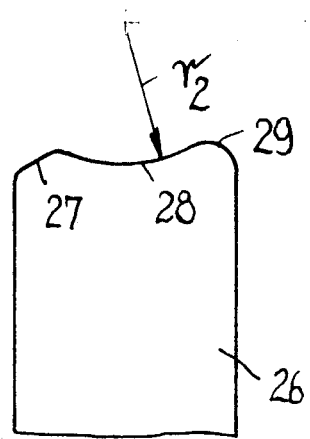
FIG. 6 shows a plan view of another cutter according to the invetion which is designed for cutting relatively thin chips.

If the carbide-tipped cutter 22, as shown in FIG. 5, which is to be employed in a scalping machine according to the invention should cut relatively thick chips, it should be provided with an inclined cutting edge 23 and a concave smoothing edge 24 which may have, for example, a radius $r$. This concave smoothing edge is necessary because of the inclined blade angle $\alpha$ to which the cutting edges 10 are adjusted relative to the workpiece. This concave curvature of the smoothing edge 24 preferably merges into a convex end 25. A carbide-tipped cutter 26 as shown in FIG. 6 which is designed for cutting relatively thin chips also has an inclined cutting edge 27 which is likewise followed by a concave edge 29 which may have, for example, a radius $r_2$ and merges into a convex end 29. While the cutter according to FIG. 5 has a relatively long inclined cutting edge 23, the inclined cutting edge 27 of the cutter according to FIG. 6 is relatively short since it only serves for starting the cut, while the concave edge 28 will continue the cutting operation and will also smooth the scalped surface.

All of the cutting edges of the cutters which are mounted in the cutter head together form a substantially conical shape through which the end of a workpiece is passed which is first to be scalped so that a previous chamfering of this end may be omitted.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In a scalping machine having means for clamping a substantially cylindrical workpiece in a nonrotatable position and for feeding said workpiece in its axial direction, a rotary cutter head adapted to revolve about said workpiece during the feeding movement thereof, a plurality of cutters mounted in said cutter head in a spokelike arrangement relative to said workpiece and rotatable with said cutter head, and means for adjusting said cutters in radial directions relative to said workpiece, the improvement comprising further adjusting means for varying the blade angle of all of said cutters relative to a plane extending at right angles to the axis of said workpiece.

2. A scalping machine as defined in claim 1, in which each of said cutters is secured to the inner end of a tool holder, means for mounting each of said tool holders in said cutter head so as to be rotatable about its own axis relative to said cutter head and said workpiece, said blade-angle adjusting means comprising pinion means rigidly secured to each of said tool holders and having teeth extending radially to the axis of said tool holder, common gear means meshing with all of said pinion means, and means for turning said common gear means so as to turn simultaneously all of said tool holders about their axes and for thereby also turning all of said cutters so as to vary the blade angle thereof.

3. A scalping machine as defined in claim 1, in which at least a part of the length of the cutting edge of each of said cutters has a substantially concave shape.

4. A scalping machine as defined in claim 3, in which said substantially concave part of said cutting edge has a curvature dependent upon the diameter of the workpiece to be scalped.

5. A scalping machine as defined in claim 1, further comprising a scalping nozzle separate from and located behind said cutter head.

6. A scalping machine as defined in claim 5, in which said scalping nozzle is mounted in a nonrotatable position and has an annular cutting edge disposed closely behind the rear sides of said cutters.

7. A scalping machine as defined in claim 5, in which a part of said scalping nozzle is at least in indirect engagement with said cutters for bracing the same in a direction substantially parallel to the axis of said workpiece.

8. A scalping machine as defined in claim 5, further comprising means for controlling and varying the temperature of said scalping nozzle.

* * * * *